3,177,114
AVAILABLE IODINE COMPOSITIONS AND METHOD FOR PREPARING THE SAME
Abraham Cantor, Elkins Park, Pa., and Murray W. Winicov, Flushing, N.Y., assignors to West Laboratories, Inc., Long Island City, N.Y., a corporation of New York
No Drawing. Filed Apr. 2, 1962, Ser. No. 184,575
3 Claims. (Cl. 167—17)

This invention relates to improved available iodine compositons of poly-N-vinyl-5-methyl-2-oxazolidinone, iodine and iodide in which the iodine is complexed to a markedly greater extent than in similar compositions which contain no added iodide.

The present invention is closely related to the subject matter of our co-pending application Serial No. 55,733, issuing April 3, 1962, as United States Patent No. 3,028,300, in which it is taught that markedly enhanced complexing of iodine with PVP, i.e., poly-(N-vinyl-2-pyrrolidone), is achieved in the presence of added iodide, and that stable complexes can thus be obtained directly without heating and without loss of iodine by reaction with the carrier. The present invention differs from this earlier teaching, however, in that it involves the use of a different carrier with which the beneficial effects of the added iodide are even more pronounced than with PVP as the iodine carrier.

The iodine carrier employed in the present invention is a water soluble poly-N-vinyl-5-methyl-2-oxazolidinone (hereinafter abbreviated as PVMO) of the formula:

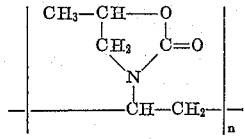

where $n$ has a value in excess of about 10. It is commercially available as "Devlex-130" (product and trademark of Dow Chemical Company), having an "$n$" value of approximately 1200.

The ability of Devlex-130 to act as a carrier or complexer for iodine is disclosed in "Chemical and Engineering News," September 5, 1960, page 56. It has been our experience, however, that the degree of complexing of iodine with Devlex-130 achieved by conventional complex formation is very low. By way of illustration:

20 grams of Devlex-130 and 2 grams of powdered iodine were mixed together and placed in a tight container in a 75° C. oven for 18 hours. Five and one-half grams of this aged powder (in which substantial iodine-iodide equilibrium had been reached) were dissolved in water to provide a total volume of 50 mls. This solution had a pH of 2.30 and contained 0.72% titratable (available) iodine and 0.17% iodide ($I^-$). When tested for distribution coefficient by the method disclosed in said co-pending application and described below, it showed a D.C. value of only 22 (as compared with the value of 200 which is considered to be the practical lower limit for satisfactory iodine complexes, i.e. free of objectionable iodine odor and free of irritating effects).

The distribution coefficient (D.C.) is determined by adding 1.00 ml. of a previously titrated test solution to 25 mls. of heptane in a stoppered glass container. The container is placed in a bath maintained at 25° C.±1° while it is agitated vigorously for one minute. The solution is then allowed to stand for a few minutes before sampling of the clear heptane layer by pipette. Iodine in heptane layer is determined at 520 mμ, the absorption peak; the relationship between absorbance and iodine concentration in this solvent is linear throughout the range 1 to 25 mg. per 100 mls. Using a Beckman model DV spectrophotometer, an absorption of 0.142 corresponded to 1.00 mg. iodine extracted/25 mls. heptane. The iodine remaining in the aqueous phase is determined by difference. The distribution coefficient is calculated by the following formula:

$$D.C. = \frac{mg. I_2 \text{ remaining in aq. phase}}{mg. I_2 \text{ in heptane}} \times \frac{mls. \text{ heptane}}{mls. \text{ aq. phase}}$$

Values so obtained are readily reproducible to within 10%, and frequently to within 1%.

It has been found in accordance with the present invention that by combining an iodide such as HI, or an alkali metal iodide with PVMO and iodine in amounts to provide more than about 0.5 part and preferably more than 1 part of iodide ($I^-$) per part by weight of iodine, products can readily be prepared having distribution coefficients greater than 200; and that by suitably increasing the $I^-$/iodine ratio degrees of complexing of iodine can be achieved which are wholly impossible by conventional methods of carrier-iodine formulations.

A lower iodine solubilizing capacity of PVMO is evidenced by the fact that in order to form stable complexes, it is necessary to have a PVMO/iodine ratio of about 4 or higher, whereas with PVP the PVP/iodine ratio can be as low as about 3. Even at PVMO/iodine ratios of 4, 5 or higher, this characteristic lower solubilizing capacity of PVMO exhibits itself in instances where too great an amount of iodide ($I^-$) may be added. Thus, an upper limit on the amount of added iodide is an amount which will be compatible, i.e. will not lead to instability as evidenced by precipitate formation, at the particular PVMO/iodine ratio. By way of illustration, with a PVMO/iodine ratio of 5, the compatibility limit for the added iodide is reached at a point slightly below an $I^-$/iodine ratio of 3, whereas at a PVMO/iodine ratio of 10, the compatibility limit for added iodide is not reached even at an $I^-$/iodine ratio of 7.5.

Regarded in certain of its broader aspects, the present invention comprises the process of preparing an available iodine composition by combining PVMO with iodine and an iodide selected from the group consisting of HI and alkali metal iodides in proportions to provide a PVMO/$I_2$ ratio of at least 4 and an $I^-/I_2$ ratio of at least 0.5, so that an aqueous solution of said iodine composition exhibits a value in excess of about 200 for distribution coefficient (D.C.) as determined by the formula:

$$D.C. = \frac{mg. I_2 \text{ remaining in aq. phase}}{mg. I_2 \text{ in heptane}} \times \frac{ml. \text{ heptane}}{ml. \text{ aq. phase}}$$

and the improved available iodine compositions so obtained.

The source of iodide can be varied depending on the nature and intended use of the product desired. For many types of products where a relatively high pH is desired (about pH 5 to 7), it is preferable to introduce iodide as an alkali metal iodide. In this way, superior powdered concentrates can be directly prepared. If a lower pH is desired, the iodide can be added as an aqueous HI solution, and suitably an HI-iodine solution containing the desired ratio of iodide ($I^-$) to iodine. It should be noted that when products containing iodide are directly prepared as dry powders as above described there will be some direct reaction of free iodine with the PVMO. After the powder has been dissolved in water, however, or in instances where aqueous concentrates are prepared directly, the presence of iodide ($I^-$) in the amounts herein disclosed stabilizes the iodine against loss by reaction with the carrier.

The following examples will serve to show how the improvements of the present invention can be employed in the preparation of various PVMO-iodine-iodide compositions, but it is to be understood that these examples are given by way of illustration and not of limitation.

EXAMPLE I 20 grams of PVMO (Devlex-130), 2.5 grams of powdered iodine and 3 grams of NaI were ground together until a homogeneous powder was obtained. 12¾ grams of this powder were dissolved in water to provide a total volume of 100 mls. This solution contained 1% titratable iodine and an iodide ($I^-$) content of 1.5%, and showed a distribution coefficient of approximately 4000.

EXAMPLE II

To 10 ml. of an 8% solution of PVMO (Devlex-130) in water, 10 mls. of an aqueous solution containing 4% KI and 2% $I_2$ were added with vigorous stirring. The resulting solution contained approximately 4% PVMO, 1.5% iodide ($I^-$) and 1% available iodine and showed a distribution coefficient of approximately 600.

EXAMPLE III

Following the procedures described in Examples I and II, but varying the relative amounts of PVMO, iodine and iodide ($I^-$) as indicated in the following tabulation, a number of formulations were prepared which are representative of the improved compositions of the present invention, as well as compositions in which the limiting conditions of the present invention have not been satisfied as reflected in the tabulated values for distribution coefficient (D.C.):

Table

| Formulation No. | Available Iodine, Percent | PVMO/$I_2$ | $I^-/I_2$ | D.C. |
|---|---|---|---|---|
| 1 | 1 | 3 | 0.35 | Unstable |
| 2 | 1 | 4 | 0.35 | 50 |
| 3 | 1 | 4 | 1.5 | 600 |
| 4 | 1 | 5 | 0.35 | 50 |
| 5 | 1 | 5 | 1.5 | 1,000 |
| 6 | 1 | 5 | 3.0 | Unstable |
| 7 | 1 | 10 | 0.35 | 70 |
| 8 | 1 | 10 | 1.5 | 4,000 |
| 9 | 1 | 10 | 3.0 | 7,400 |
| 10 | 1 | 10 | 7.5 | 12,000 |
| 11 | 0.5 | 10 | 1.5 | 1,100 |
| 12 | 0.5 | 10 | 3.0 | 2,200 |
| 13 | 0.25 | 10 | 1.5 | 370 |
| 14 | 0.25 | 10 | 3.0 | 600 |
| 15 | 0.125 | 10 | 1.5 | 91 |
| 16 | 0.125 | 10 | 3.0 | 170 |
| 17 | 0.125 | 10 | 6.0 | 350 |

In the foregoing tabulation, formulations 1 and 6 are illustrative of low solubilizing capacity of PVMO at the lower PVMO/I ratios as previously described. Formulations 2, 4 and 7 are illustrative of insufficient iodide, i.e. too low an $I^-/I_2$ ratio. Formulations in the group 8 to 17 are illustrative of the fall-off of D.C. values upon progressive dilution, and the need to increase the $I^-/I_2$ ratio with progressive dilution in order to maintain the D.C. value above 200 or at some desired higher level.

Various changes and modifications in the compositions and formulation procedures herein disclosed will occur to those skilled in the art, and to the extent that such changes and modifications are embraced by the appended claims, it is to be understood that they constitute part of our invention.

We claim:

1. The process for directly preparing an available iodine composition of enhanced iodine complexing that comprises combining poly-N-vinyl-5-methyl-2-oxazolidinone with iodine and an iodide selected from the group consisting of HI and alkali metal iodides in proportions to provide a poly-N-vinyl-5-methyl-2-oxazolidinone/$I_2$ ratio of at least 4 and an $I^-/I_2$ ratio of at least 0.5 so that an aqueous solution of said iodine composition exhibits a value in excess of about 200 for distribution coefficient (D.C.) as determined by the formula:

$$D.C. = \frac{\text{mg. } I_2 \text{ remaining in aq. phase}}{\text{mg. } I_2 \text{ in heptane}} \times \frac{\text{ml. heptane}}{\text{ml. aq. phase}}$$

2. An available iodine composition consisting essentially of a complex of poly-N-vinyl-5-methyl-2-oxazolidinone with iodine and an iodide selected from the group consisting of HI and alkali metal iodides prepared by the process as defined in claim 1.

3. An available iodine composition consisting essentially of a complex of poly-N-vinyl-5-methyl-2-oxazolidinone with iodine and an iodide selected from the group consisting of HI and alkali metal iodides, and the proportions of poly-N-vinyl-5-methyl-2-oxazolidinone, iodine and iodide being such as to provide a poly-N-vinyl-5-methyl-2-oxazolidinone/$I_2$ ratio of at least 4, and an $I^-/I_2$ ratio of at least 0.5 so that an aqueous solution of said iodine composition exhibits a distribution coefficient (D.C.) in excess of about 200 as determined by the formula:

$$D.C. = \frac{\text{mg. } I_2 \text{ remaining in aq. phase}}{\text{mg. } I_2 \text{ in heptane}} \times \frac{\text{mls. heptane}}{\text{mls. aq. phase}}$$

References Cited in the file of this patent

UNITED STATES PATENTS 2,987,505    Werner    June 6, 1961
3,028,300    Cantor et al.    Apr. 3, 1962

OTHER REFERENCES

Chemical and Engineering News, September 1960, page 56.